United States Patent [19]

Schroeder

[11] 4,245,191

[45] Jan. 13, 1981

[54] METHOD AND APPARATUS FOR DETECTING AND MEASURING INCLUSIONS IN SUBSOIL

[76] Inventor: Diether Schroeder, Im Schöntal, Oedekoven, Fed. Rep. of Germany

[21] Appl. No.: 958,555

[22] Filed: Nov. 7, 1978

Related U.S. Application Data

[62] Division of Ser. No. 739,848, Nov. 9, 1976, Pat. No. 4,125,804.

[30] Foreign Application Priority Data

Nov. 12, 1975 [DE] Fed. Rep. of Germany ....... 2550715

[51] Int. Cl.³ .......................... G01V 3/17; G01V 3/12
[52] U.S. Cl. ................................. 324/337; 343/5 NA
[58] Field of Search .............. 324/334, 337, 52, 58 B, 324/58.5 B; 343/6.5 R, 12 R, 17; 340/5 NA

[56] References Cited

U.S. PATENT DOCUMENTS

| | | | |
|---|---|---|---|
| 2,172,688 | 9/1939 | Barret | 324/334 |
| 2,766,422 | 10/1956 | Carbonetto | 324/337 |
| 2,919,397 | 12/1959 | Morley | 324/334 |
| 2,994,031 | 7/1961 | Slattery | 324/334 |
| 3,168,694 | 2/1965 | Slattery | 324/334 |
| 3,392,384 | 7/1968 | Wesch | 324/337 X |
| 3,440,523 | 4/1969 | Gabillard | 324/337 |
| 3,634,753 | 1/1972 | Unterberger | 324/337 |
| 3,665,466 | 5/1972 | Hibbard | 324/337 X |
| 3,745,575 | 7/1973 | Kikuchi | 324/337 X |
| 3,836,960 | 9/1974 | Gehman et al. | 324/337 X |

*Primary Examiner*—Gerard R. Strecker
*Attorney, Agent, or Firm*—Burns, Doane, Swecker & Mathis

[57] ABSTRACT

A method and apparatus is described comprising a transmitter for transmitting an unmodulated carrier of selected wave length into the ground and a receiver adapted to receive reflected signals. Circuitry is described for producing narrow pulses from the transmitted and received signals for displaying them on an oscilloscope and on a plotter. The display on the oscilloscope is rotated through 90° from the conventional display so that the pulses corresponding to the transmitted and reflected signals appear as horizontal bars spaced apart vertically by distances which correspond to the depth of the inclusions below the surface.

The wave length is selected to be at least four times the anticipated depth of the inclusions.

The apparatus is described as being incorporated into a motor vehicle such as a Land Rover with the transmitting antenna mounted at the front and the receiving antenna at the rear of the vehicle. The apparatus is most conveniently situated in place of the co-driver's seat for operation by an operator sitting in the rear of the vehicle.

Decoupling between transmitting and receiving antennae is partially achieved due to the rotation through 90° of the polarity of the reflected wave relative to the transmitted wave.

22 Claims, 3 Drawing Figures

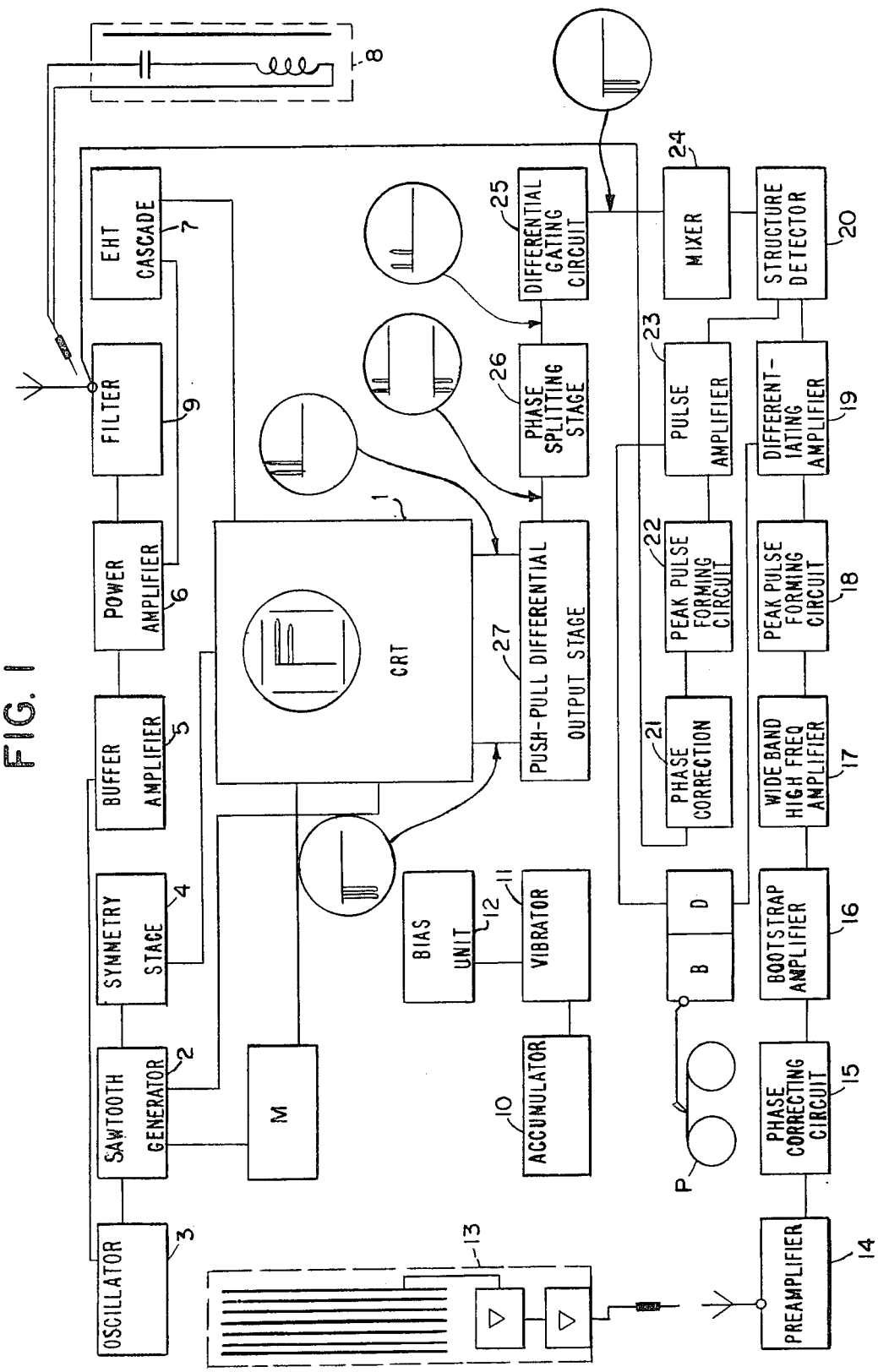
FIG. I

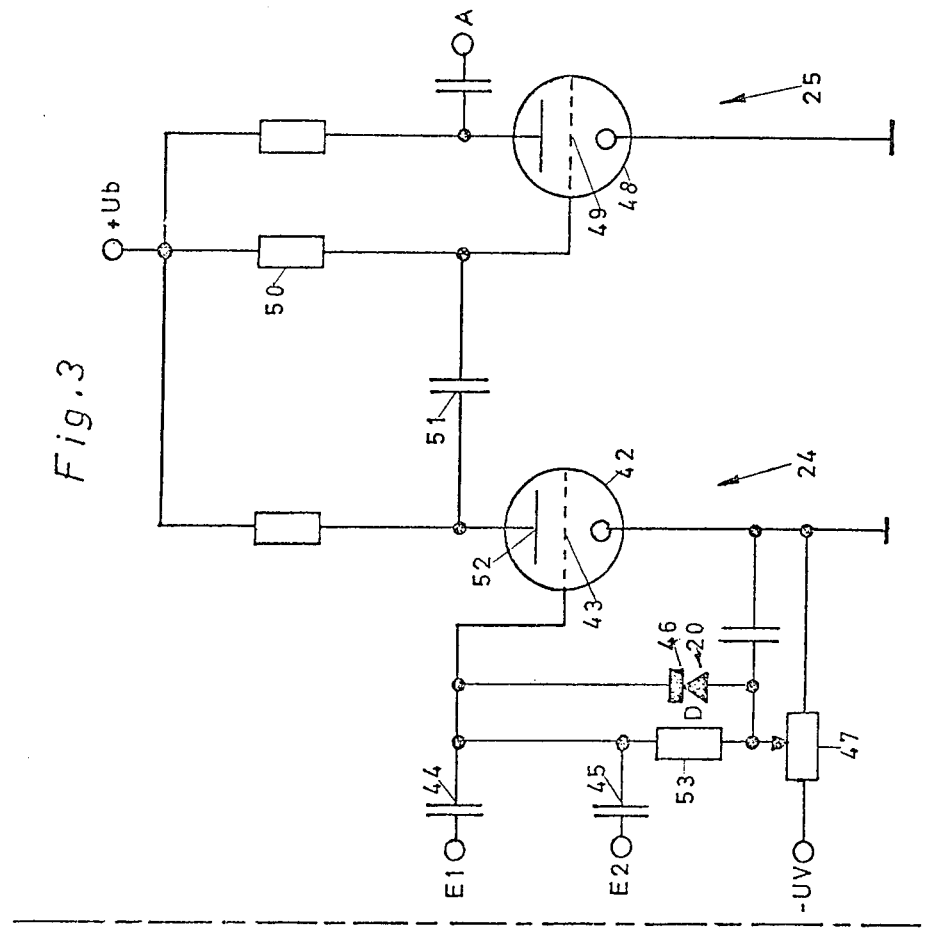
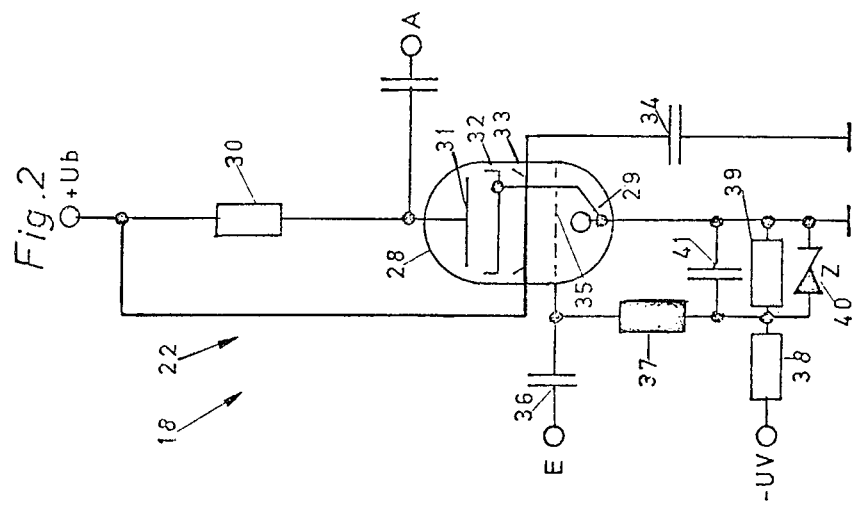

METHOD AND APPARATUS FOR DETECTING AND MEASURING INCLUSIONS IN SUBSOIL

This is a division of application Ser. No. 739,848, filed Nov. 9, 1976 and issued on Nov. 11, 1978, as U.S. Pat. No. 4,125,804.

FIELD OF THE INVENTION

This invention concerns the detection and measurement of inclusions contained in the subsoil such as metals and minerals, pipe lines and underground water resources.

DESCRIPTION OF THE PRIOR ART

It is known to explore the subsoil for mineral deposits using seismic exploration techniques which invariably employ explosives to generate a blast wave. Such techniques are expensive and require skilled personnel and in many countries cannot be undertaken without the prior obtaining of an explosives licence and prospecting licence, the costs of which can be very considerable so that this type of exploration can only be undertaken in respect of potentially very profitable reserves such as oil fields. Furthermore on loose soils, for example volcanic ash, the seismic exploration technique employing a blast wave is of limited use since the blast wave cannot penetrate the loose soil.

Another known method is the Transient or IP technique which requires very expensive high-powered DC high voltage pulse generators the operation of which is not without danger. The pertenance-time of the DC pulse and its running-time are such that this technique is only useful for very large areas.

It is also known to explore for minerals etc. by airborne techniques but such techniques are only applicable to the exploration of large areas.

OBJECTS OF THE INVENTION

It is an object of the invention to provide an improved method of detection and measurement of inclusions such as metals and minerals in the subsoil which does not require the use of explosives or high power DC high voltage electrical pulses.

It is another object of the present invention to provide apparatus for performing the method of the invention.

SUMMARY OF THE INVENTION

According to the present invention a method for detecting and measuring inclusions contained in the subsoil comprises the steps of transmitting electromagnetic radiation towards the surface of the earth the subsoil of which is to be investigated, detecting any subsequent reflection of the electromagnetic radiation, converting the transmitted and reflected electromagnetic radiation into two sequences of electrical pulses and displaying the two sequences of pulses on a cathode ray tube display thereby to allow the two pulse sequences to be evaluated and compare.

The invention is particularly applicable to the detection of metal and mineral deposits or fittings such as pipes not a great distance underground and is of further advantage since it has been found that electromagnetic waves will penetrate volcanic ash and lava.

According to a preferred feature of the invention the electrical pulses are differentiated to produce sharp needle pulses for display. It has been found that needle pulses are the most suitable for demonstration in the cathode ray tube display. The distance between the differentiated pulse corresponding to the transmitted wave and the differentiated pulse corresponding to the reflected wave will be a measure of the distance between the transmitter and the inclusion or object below the surface of the earth. Where the transmitter is located at or just above the surface, this distance will therefore correspond to the depth of the inclusion or object below the surface.

Preferably the wave-length subsoil of the electromagnetic radiation employed is four times greater than the anticipated distance of the inclusion which is to be detected.

According to another preferred feature of the invention, the differentiated pulses are employed after amplification to deflect the scanning beam in the cathode ray tube display in the X direction and a simple time base is applied to the coils or plates producing deflection in the Y direction. In this way the differentiated pulses will appear horizontally and will be displayed one below the other thereby giving a more representative display of depth than would be the case if the time base were applied to the X axis and the differentiated pulses produced deflection in the Y direction.

Apparatus for performing the invention conveniently comprises a high frequency quartz oscillator, signal amplifying means for amplifying the oscillator output, an antenna for transmitting the amplified signals as an unmodulated electromagnetic wave, a receiving antenna, a wideband high frequency amplifier for amplifying received signals, a signal mixer for combining signals derived from the transmitter on the one hand and from the wideband high frequency receiver amplifier on the other hand and a cathode ray tube display device to which the output from the mixer is applied to deflect the scanning beam in one direction.

Preferably the apparatus includes means for producing pulses from the sinusoidal waveforms which are transmitted and received, means for removing pulses of one polarity and leaving only pulses of the other polarity, means for differentiating the remaining pulses and signal amplifier means for amplifying the differentiated pulses to produce deflection signals for cathode ray tube display.

Apparatus for performing the invention may be incorporated into a motor vehicle such as a Land Rover or jeep so that a large area of land can be explored readily and easily. The oscillograms may be recorded on film or alternatively the cathode ray tube display may be supplemented by a magnetic recording device for producing a magnetic record of the electrical voltages or a pen-tracker may be substituted for the oscilloscope and a trace produced on paper additionally of the oscillogram.

Typically the apparatus may be arranged in the cab of the vehicle in place of the co-driver's seat so that the equipment can be operated by a second person sitting on a rear seat behind the driver. In this way the vehicle only needs two personnel one to drive it and the other to operate the equipment.

According to a further preferred feature of the invention the transmitting and receiving antennae are directional large ferrite rod antennae having slitted metal screening and are decoupled so that the one does not interfere with the other.

It is found in practice that the polarisation of the received signal after reflection is of the order of 90° relative to the polarisation of the transmitted signal. This allows for additional decoupling between the transmitting and receiving antennae. Typically the transmitting antenna is installed on the front of the vehicle and produces horizontally polarised electromagnetic radiation and the receiving antenna is mounted on the rear of the vehicle and is adapted to receive vertically polarised electromagnetic radiation. An ordinary vehicle may be fitted with the apparatus with the receiving antenna carried on a mechanism secured to a roof rack on the vehicle. In ordinary traffic the receiving antenna can be stowed on the roof rack but for exploration the receiving antenna can be lowered down to the rear of the vehicle and locked into position by the said mechanism.

It is important that the receiving antenna and the receiver amplifier stages are wideband devices so as to admit echo reception from several sources.

BRIEF DESCRIPTION OF THE DRAWINGS

FIG. 1 is a block schematic diagram of a receiver and transmitter unit embodying the invention, FIG. 2 is a circuit diagram of a pulse forming circuit, and FIG. 3 is a circuit diagram of the structure detector and pulse mixer and differentiation stage employed in the receiver transmitter.

DESCRIPTION OF THE PREFERRED EMBODIMENT

In the block schematic diagram of FIG. 1 a cathode ray tube 1 with its associated wiring is connected to a sawtooth generator 2. The latter is driven by a quartz oscillator 3. For symmetry of the sawtooth waveform a symmetry stage 4 is provided and the X deflection signals of the cathode ray tube 1 are supplied to the symmetry stage 4. The latter ensures that the sawtooth waveform is symmetrical.

The signal from the quartz controlled oscillator 3 is also supplied through a buffer amplifier 5 to a power amplifier 6 and the latter supplies power to the transmitting antenna 8 via filter 9. The power amplifier 6 also provides a high frequency signal to an EHT cascade 7 the high voltage side of which provides the EHT for the cathode ray tube 1.

The transmitting antenna 8 is coupled to the antenna filter 9 output via a coaxial cable.

Typically the transmitting antenna 8 is a large magnetically screened ferite rod antenna with a directional wave propagation characteristic.

Typically the power supply for the whole circuit (i.e. receiver and transmitter) is derived from conventional car batteries and to this end a double accumulator of two 6-volt cells identified by reference numeral 10 is shown in FIG. 1. Between the accumulator 10 and the remainder of the circuit is located a vibrator or inverter 11 for producing DC-supply current from the batteries 10 and a bias unit 12.

The transmitting antenna 8 which is typically mounted on the front bumper of a motor vehicle, radiates unmodulated sine wave electromagnetic radiation into the ground. The radiation is reflected from certain objects such as minerals, metal objects, water and other such inclusions. The subsoil wave-length of the radiation is selected to be four times greater than the maximum anticipated depth of the inclusion which is being looked for.

As a result of being reflected it is found that the polarization of the radiation is rotated through approximately 90°. To that end a receiving antenna 13 which is directed so as to receive reflected sine waves and is typically assembled on the rear bumper of the same motor vehicle as the transmitter antenna, is adapted to receive electromagnetic radiation having a polarity rotated through 90° from the transmitted radiation. In this way the receiving antenna is rendered largely insensitive to direct radiation from the transmitting antenna and the necessary decoupling between the two antennae can be simplified.

Typically the transmitting antenna 8 is horizontally polarised and the receiving antenna 13 is vertically polarised.

The receiving antenna 13 is also a magnetically screened large ferrite rod antenna and is designed to have a wideband width so as to provide for multi-echo reception and conveniently a wideband preamplifier and line amplifier are provided.

The bandwidth of the receiving antenna can be enhanced by being formed from seven large ferrite rods formed from thirty-five separate ferrite members arranged as a hexagon in the form of seven damped parallel resonant circuits connected in series each of the resonant circuits having different resonant frequencies according to the well-known Butterworth formula.

The received signal from receiving antenna 13 is amplified by preamplifier 14, a phase correcting circuit 15 and a bootstrap amplifier 16. The main signal amplification is achieved by a gain controlled wide-band high frequency amplifier 17 the output of which is supplied to a peak pulse forming circuit 18. In the latter the received and amplified sinusoidal waveforms are transformed to peak pulse wave forms. A circuit for performing this pulse shaping is shown in FIG. 2 and will be described hereinafter.

The output signal of the peak pulse forming circuit 18 is supplied to a differentiating amplifier 19 and from there to the structure detector 20 which is connected to the mixing stage 24 and these two circuits will be described in more detail with reference to FIG. 3.

In the peak pulse forming circuit 18 only the positive going half waves of the sinusoidal waveform will be converted to peak pulses. These are then differentiated and amplified and phase inverted i.e. rotated in phase through 180° by the differentiating amplifier 19. The structure detector 20 causes negative signals to be cut off so that positive pulses only are supplied via the mixer 24.

So far only one input signal for the structure detector and mixer circuits 20 and 24 has been considered and simultaneously with the generation of this first input signal from the receiver a second input signal is derived from the transmitted signal from the antenna filter 9. This second input signal for the structure detector 20 is derived from the antenna filter 9 and after phase correction in phase correction circuit 21, the sinusoidal waveform is converted to peak pulses in a pulse forming circuit 22 which is similar to pulse forming circuit 18 previously described. A pulse amplifier 23 which is adapted to differentiate the signals from 22 provides the second input to structure detector 20 and mixer circuit 24.

After mixing in the mixer circuit 24, the additively mixed signals of the two peak pulse waveforms are again differentiated in a differentiation circuit 25 to produce needle-sharp pulses. These needle pulses are supplied to a phase splitting stage 26 to produce an antiphase electrical output in known manner. The two antiphase signals are supplied to the two inputs of a push-pull differential output stage 27. From the two antiphase outputs of the push-pull output stage the antiphase needle pulse power signals are supplied to the Y deflection plates of a cathode ray tube display device 1.

The X deflection terminals of the cathode ray tube display device are connected to the sawtooth generator 2 which provides a sawtooth in the form of an isosceles triangle, the frequency of which is rigidly linked to the transmitting frequency. In this way the sequencies and needle pulses derived from the original sine wave signals are depicted on the screen of the cathode ray tube device 1 in strict synchronism and spaced apart on the screen proportionally to the time between transmitted and reflected pulses. By tilting the cathode ray tube display so that the display is at 90° to the normal inclination of the display, the X axis will appear vertical and the horizontal needle pulses will be arranged vertically one below the other. The spacing between the needle pulses is analagous to the distance of the located inclusions from the surface of the ground.

The pulse shaping circuits 18 and 22 and the pulse amplifiers 19 and 23 and the differentiation stage 25 and push-pull differential output stage 27 serve to amplify only the tops of the sine waveform in a distorted manner so as to produce a large amplitude pulse in the Y axis direction and a narrow amplitude pulse in the X axis direction on the cathode ray tube display (the X and Y axes treated conventionally).

The invention is based on the principle that by radiating unmodulated electromagnetic signals of a relatively long wave length (a minimum of four times longer than the anticipated measuring distance) into the soil, and receiving reflected signals and mixing pulses from the transmitted and received signals so these can be displayed on an oscilloscope or similar cathode ray tube device for the purpose of evaluation and comparison. The evaluation may be performed visually and in real time. It is of course possible to photograph the oscillogram and to install a plotter which follows the pulses and produces a line trace on a roll of paper. This latter may be used additionally to the oscilloscope.

One form of circuit for use at 18 or 22 in FIG. 1 is shown in FIG. 2. In this circuit a pentode 28 with its cathode connected to earth has a small resistor 30 connected between the anode 31 and a positive supply line Ub+. The cathode 29 is connected to the suppressor grid 32 and the screen grid 33 is connected directly to the positive supply line Ub+. The screen 33 is decoupled via a capacitor 34 to earth. The input signals in the form of sinusoidal waveforms at terminal E are supplied to the control grid 35 via a capacitor 36. The control grid 35 is also connected to a large high frequency choke 37 the other end of which is connected to a source of negative bias taken from a voltage divider comprising resistors 38 and 39. The resistor 39 is decoupled by a capacitor 41 and a zener-diode 40 which stabilises the voltage across resistor 39. The bias voltage is selected so that the valve is cut off by virtue of the negative bias voltage maintained by zener-diode 40. The circuit relies on the fact that the incoming signal is positive going. As an incoming positive sinusoid increases the voltage at E this potential is transferred via a capacitor 36 to the control grid 35 and when the amplitude of the incoming signal is sufficient to overcome the bias, the valve conducts and an output waveform results. Because of the high gain characteristic of a pentode, the voltage appearing at the control grid 35 is amplified strongly to produce substantial negative excursions of the anode voltage. Input signals which do not have sufficient amplitude to cause the valve to conduct and negative going input signals do not produce any negative going excursions in the anode voltage. The high frequency choke 37 represents a high resistance path to alternating current frequencies but a low resistance path to direct currents. This in cooperation with the zener-diode 40 and smoothing capacitor 41 prevents the rise of the rectified voltages on control grid 35 which would otherwise shift the operating point of the valve and thus produce a change in phase of the voltage pulses produced. This would in turn result in a phase shift of the needle pulses which are finally displayed on the screen.

FIG. 3 illustrates the mixing circuit and structure detector. The mixing circuit comprises a triode 42 the control grid 43 of which is connected via capacitors 44 and 45 with two input signals E1 and E2. The structure detector 20 comprises a diode 46 connected in parallel with a resistor 53 between the grid 43 and the tapping of a variable potentiometer 47 connected between earth and a source of negative voltage −UV. The potentiometer tapping is decoupled via a capacitor also to earth potential. The first differentiation stage 25 comprises a triode 48 whose grid 49 is connected via a high resistance resistor to the positive source of potential +Ub and via a capacitor 51 to the anode 52 of the triode 42 which is working as the peak pulse mixer 24. The capacitor 51 is very small having only a few picofarads capacitance.

The negative bias applied to the grid 43 is adjustable by adjusting the potentiometer 47. Signals coming from the pulse amplifiers 19 and 23 (see FIG. 1) are connected to the input terminals E1 and E2. Pulse portions of negative polarity are connected to earth by diode 46 while positive going pulses are supplied to the grid 43. Thus only positive going pulses will be amplified.

Because both of the input signals from E1 and E2 are connected in parallel the output signal from anode 52 and supplied via capacitor 51 to the grid 49 of the triode 48 represents an addition of the two input signals. At the output terminal A of the triode 48 a further sharply differentiated signal (i.e. a needle-type pulse) can be obtained and is connected to the phase-splitting stage of FIG. 1.

It has not been found possible to calibrate the display in meters because there is too much variation of the dielectric constant and the specific resistance of the subsoil through which the radiation is transmitted and reflected. This means that it is necessary to measure in advance the signal and echo timing in microseconds and thereafter make the necessary calculations when the values for particular subsoil are known. The magnetic constant is usually 1 and does not vary very much. The measuring of the running time between transmission and echo receive can be measured by producing bright spots on the cathode ray tube screen at equal distances corresponding to one microsecond. This is most simply achieved by providing a small square wave quartz-controlled oscillator operating at 1 MHZ synchronised from the source of generator 2 (see FIG. 1) and producing needle pulses from the square wave oscillator output pulses of appropriate polarity and supplying these to either the cathode or the control grid of the cathode ray tube 1 (see FIG. 1). The operator is provided with means for adjusting the position of the bright spot marks on the screen so that they can be lined up with calibration engraving on the window of the screen.

When the cathode ray tube 1 has two beams, the marking oscillator is preferably divided by two to produce square waves of 0.5 MHZ and of high amplitude and means is provided for supplying these to the Y deflection of the second beam. The second beam X deflection is coupled in parallel to the X deflection of the first system. This means that horizontal marker lines with a distance of 1 microsecond will appear and the screen window does not need any calibration engraving.

For the steering of a plotter P a phase discriminator D circuit is needed adapted to receive both pulse signals from the grids of the pulse amplifiers 19 and 23. The resulting discrimination voltage is then supplied to a bootstrap amplifier B. The output from this bootstrap amplifier is coupled to a separate plotter terminal on the panel. The paper roll support of the plotter is then synchronised with the speed of the vehicle. The plotter must be suitable to work on the supply voltage available on the vehicle typically 12 volts and a mechanical point-marker is of advantage.

I claim:

1. Apparatus for detecting and measuring inclusions contained in the subsoil comprising:
   a high frequency quartz oscillator;
   a signal amplifying means for amplifying the oscillator output signal;
   an antenna for transmitting the amplified signals as an unmodulated electromagnetic wave;
   a receiving antenna;
   a wide band high frequency amplifier for amplifying received signals;
   a signal mixer means for combining and processing signals derived from the transmitter on the one hand and from the wideband high frequency amplifier on the other hand including a peak pulse forming circuit which produces pulses of reduced width for supplying peak pulses to be mixed, a structure detector which cuts off negative going pulse portions of said peak pulses and means for differentiating and phase splitting the mixed peak pulses followed by a push-pull differential output stage; and
   a cathode ray tube display device to which the output from the mixer means is applied to deflect the scanning beam in one direction.

2. Apparatus as set forth in claim 1 in which the peak pulse forming circuit for producing pulses of reduced width includes a pentode thermionic valve the control grid of which is connected via a large high frequency choke to a stabilised negative bias sufficient to cut off the valve while the screen grid of which is supplied with the full positive supply voltage.

3. Apparatus as set forth in claim 2 in which the large high frequency choke is connected at its lower end to a voltage divider and the negative bias is developed across the earthed end of the voltage divider and a smoothing capacitor and zener-diode are connected in parallel with that section of the voltage divider across which the bias is developed.

4. Apparatus as set forth in claim 1 in which the mixer includes a triode thermionic valve to the control grid of which both input signals are connected in parallel via two capacitors and in which the structure detector comprises a diode for removing alternating current from the input circuit.

5. Apparatus as set forth in claim 1 in which the differentiation stage includes a triode thermionic valve the control grid of which is connected via a high resistance resistor to the positive supply line and is also connected via a very small capacitor to the anode of the triode thermionic valve included in the peak pulse mixing circuit.

6. Apparatus as set forth in claim 4 wherein the control grid of the triode thermionic valve comprising the mixing valve is connected via a resistor to the movable contact of a potentiometer for supplying a variable negative bias to the control grid.

7. Apparatus as set forth in claim 1 when fitted to a motor vehicle.

8. Apparatus as set forth in claim 7 in which the transmitter and receiver units and oscilloscope display device are installed in the vehicle in place of a co-driver's seat with the oscilloscope display and control panels for the apparatus within reach of a person sitting on a rear seat of the vehicle.

9. Apparatus as set forth in claim 7 in which the transmitting antenna and receiving antenna are screened from one another.

10. Apparatus as set forth in claim 7 in which the receiving antenna is rotated through 90° in relation to the transmitting antenna.

11. Apparatus as set forth in claim 10 in which the transmitting antenna is horizontally polarised and the receiving antenna is vertically polarised.

12. Apparatus as set forth in claim 7 in which the transmitting antenna is mounted at the front of the vehicle and the receiving antenna is mounted at the rear of the vehicle.

13. Apparatus as set forth in claim 7 in which the receiving and transmitting antennae are screened and decoupled for electric as well as for magnetic waves so that no direct transmission is possible therebetween.

14. Apparatus as set forth in claim 7 in which the receiving antenna is of wide band width and includes an integral wideband preamplifier and cable amplifier.

15. Apparatus as set forth in claim 7 in which the wideband width of the receiving antenna is achieved by serially coupling a plurality of single ferrite rod arrays each containing a resistance damped parallel connected resonant circuit of unique frequency selected according to the well-known Butterworth or Tschebytscheff formulae.

16. Apparatus as set forth in claim 15 in which the plurality of large ferrite rod arrays each containing several ferrite rod elements are arranged in a hexagon assembly with or without a centre and are enclosed from a thick plastics tube with a slitted metal screen.

17. Apparatus as set forth in claim 1 in which means is provided for generating electrical pulses to produce bright spot marks in the cathode ray tube display spaced apart at intervals of 1 microsecond or a multiple thereof and adjustable into alignment with the calibration engraving on the screen window by the operator.

18. Apparatus as set forth in claim 17 in which the means for generating the electrical pulses to produce the bright spot marks in the screen comprises a quartz-controlled square wave oscillator operating at 1 MHZ or a multiple thereof and synchronised by the sawtooth generator producing the deflection signals for the cathode ray tube display time base, means for producing needle pulses from the square wave oscillator and adjusting the polarity thereof and amplitude thereof so as to render them suitable as control grid or cathode control pulses of the cathode ray tube.

19. Apparatus as set forth in claim 18 in which the cathode ray tube has two or more beams and the crystal controlled 1 MHZ oscillator produces square waves of high amplitude and means is provided for supplying these to the Y deflection of the second beam system so as to produce horizontal marker lines on the screen.

20. Apparatus as set forth in claim 1 in which the cathode ray tube display is supplemented by a plotter synchronised with the speed of the vehicle and steered by a bootstrap amplifier from a phase discriminator which receives both pulse signals from the grids of the pulse amplifiers to produce a line trace on the paper roll.

21. Apparatus as set forth in claim 20 further comprising means for photographing the oscillogram on the cathode ray tube display to produce a permanent record of the trace.

22. A portable apparatus for detecting and measuring inclusions contained in the subsoil comprising:

means for generating a continuous, unmodulated, sinusoidal signal having a wavelength at least four times that of an anticipated depth of the inclusions;

a first antenna for transmitting the generated signal;

a second antenna for receiving the signal reflected by an inclusion encountered;

a high frequency amplifier for amplifying the received signal; and means for converting the generated and received signals into pairs of pulses and for displaying said pulses, the separation of the pulses of each displayed pair being representative of the depths of the inclusion; said converting and displaying means including:

first peak pulse forming circuit for processing the generated sinusoidal signal;

second peak pulse forming circuit for processing the received signal;

a mixer for combining the output signals of said first and second peak pulse forming circuits of the same polarity to provide the paired pulses;

cathode ray tube display; and means for applying deflection signals to said cathode ray tube display responsive to the paired pulses from said mixer.

* * * * *